(12) United States Patent
Kim et al.

(10) Patent No.: US 10,458,046 B2
(45) Date of Patent: *Oct. 29, 2019

(54) METHOD FOR MANUFACTURING GRAPHENE FIBER

(71) Applicant: IUCF-HYU (INDUSTRY-UNIVERSITY COOPERATION FOUNDATION HANYANG UNIVERSITY), Seoul (KR)

(72) Inventors: Seon Jeong Kim, Seoul (KR); Min Kyoon Shin, Seoul (KR); Shi Hyeong Kim, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/898,762

(22) Filed: Feb. 19, 2018

(65) Prior Publication Data

US 2018/0274132 A1 Sep. 27, 2018

Related U.S. Application Data

(62) Division of application No. 14/004,837, filed as application No. PCT/KR2012/001724 on Mar. 9, 2012, now abandoned.

(30) Foreign Application Priority Data

Mar. 15, 2011 (KR) .................. 10-2011-0022833

(51) Int. Cl.
*D01F 9/12* (2006.01)
*D02J 13/00* (2006.01)
*D01D 1/02* (2006.01)
*D01D 5/06* (2006.01)
*D01D 10/02* (2006.01)
*D01F 1/10* (2006.01)
(Continued)

(52) U.S. Cl.
CPC ............. *D01F 9/12* (2013.01); *B82Y 30/00* (2013.01); *D01D 1/02* (2013.01); *D01D 5/06* (2013.01); *D01D 10/02* (2013.01); *D01F 1/10* (2013.01); *D01F 6/14* (2013.01); *D01F 6/16* (2013.01); *D01F 11/14* (2013.01); *D02J 13/00* (2013.01); *Y10T 428/2918* (2015.01)

(58) Field of Classification Search
USPC ...... 264/184, 185, 203, 211, 211.14, 211.15, 264/211.16, 211.17, 235
See application file for complete search history.

(56) References Cited

U.S. PATENT DOCUMENTS

2007/0092716 A1 4/2007 Guo et al.
2010/0317790 A1 12/2010 Jang et al.
2016/0318767 A1* 11/2016 Kim .................. D01D 1/02

FOREIGN PATENT DOCUMENTS

WO 2010/096665 A1 8/2010

* cited by examiner

*Primary Examiner* — Lynda Salvatore (57) ABSTRACT

The present invention relates to a graphene conjugate fiber and a method for manufacturing same, and more particularly, to a conjugate fiber including graphene and a polymer, wherein a wrinkled structure of the graphene is maintained in a fiber state. The graphene conjugate fiber manufactured thereby has superior mechanical properties, is flexible, and has high utility by being manufactured as a fiber.

11 Claims, 8 Drawing Sheets

Graphene gel → Graphene composite fiber

(51) Int. Cl.
*D01F 11/14* (2006.01)
*B82Y 30/00* (2011.01)
*D01F 6/14* (2006.01)
*D01F 6/16* (2006.01)

FIG.9B

METHOD FOR MANUFACTURING GRAPHENE FIBER

CROSS-REFERENCE TO RELATED APPLICATIONS

This application is a division of U.S. patent application Ser. No. 14/004,837 filed on Sep. 12, 2013, now abandoned, which is an U.S. national phase application of PCT International Application PCT/KR2012/001724, filed on Mar. 9, 2012, which claims priority to Korean Patent Application No. 10-2011-0022833 filed on Mar. 15, 2011, the contents of which are incorporated herein by reference in their entirety.

TECHNICAL FIELD

The present invention relates to a polymer composite fiber including graphene and a method for producing the same. More specifically, the present invention relates to a flexible graphene composite fiber with outstanding mechanical properties and a method for producing the graphene composite fiber.

BACKGROUND ART

Graphene is a two-dimensional nanostructure of covalently bonded carbon atoms and exhibits surprising mechanical, electrical, and thermal properties. Graphene flakes consist of single or several graphene sheets exfoliated from graphite. Graphene flakes have been reconstituted into bulky structures that have a modulus exceeding that of flexible graphite while possessing high strength.

A major challenge for graphene structures with high strength and toughness is to maintain the inherent active surface of graphene by preventing restacking of graphene tending to form close-packed layer structures. Single-layer graphene or a graphene flake has a wrinkled structure due to high area-to-thickness ratio thereof, but a graphene paper or composite including a large amount of graphene usually has a dense layer structure similar to graphite. The dense layered structure of graphene is an obstacle in achieving maximum mechanical properties owing to the short length of graphene that reduces the van der Waals force and tensile strength between graphene layers (by 1% or less).

There is no report on graphene composites including a considerable concentration of graphene while maintaining the inherent wrinkled structure of graphene. Little is also known about the development of fibers from graphene composites.

DISCLOSURE

Technical Problem

It is an object of the present invention to provide a graphene composite fiber that is flexible and has outstanding mechanical properties in terms of strength, toughness, and modulus of elasticity, and a method for producing the graphene composite fiber.

Technical Solution

According to an aspect of the present invention, there is provided a graphene composite fiber including graphene and a polymer wherein the wrinkled structure of the graphene is maintained unchanged.

In one embodiment of the present invention, the contents of the graphene and the polymer in the composite fiber are preferably from 20 to 90% by weight and from 10 to 80% by weight, respectively. Within these ranges, the wrinkled structure of the graphene composite fiber can be maintained.

The length of the graphene in the composite fiber is preferably from 100 to 1000 nm.

In one embodiment of the present invention, the polymer may be selected from polyvinyl alcohol and poly(methyl methacrylate).

The graphene composite fiber of the present invention may be formed into knot and spring structures due to flexibility thereof, and several strands thereof may also be woven into a fabric.

The graphene composite fiber of the present invention has a toughness of 1 to 5.5 $MJ/m^3$, a mechanical strength of 100 to 300 MPa, a modulus of elasticity of 5 to 30 GPa, and a storage modulus of 1 to 10 GPa at 20 to 200° C.

The diameter of the graphene composite fiber is from 30 to 100 μm.

The present invention also provides a method for producing a graphene composite fiber, including a) dispersing graphene and a surfactant in a solvent to prepare a dispersion, and b) incorporating the dispersion into a polymer solution, wet spinning the resulting solution, followed by drying to produce a fiber.

In one embodiment of the present invention, the method may further include annealing the fiber obtained in b) at a high temperature of 140 to 160° C. or dipping the fiber obtained in b) in methanol or acetone to improve the degree of crystallization of the fiber.

In one embodiment of the present invention, the surfactant may be selected from sodium dodecyl benzene sulfonate (SDBS), sodium dodecyl sulfonate (SDS), Triton X-100, and cetyltrimethylammonium bromide (CTAB). The use of sodium dodecyl benzene sulfonate (SDBS) is more preferred.

In one embodiment of the present invention, the graphene is preferably chemically reduced graphene, more preferably chemically reduced graphene with acid functional groups.

In one embodiment of the present invention, the chemically reduced graphene may be prepared by reducing an aqueous dispersion of graphene with hydrazine at 90 to 100° C. for 1 to 24 hours.

Advantageous Effects

The graphene composite fiber of the present invention, which includes graphene whose wrinkled structure is maintained, exhibits far superior mechanical properties to conventional graphene papers, graphene composite films, and flexible graphite. In addition, the graphene composite fiber of the present invention can be formed into knot or spring structures due to flexibility thereof and can also be woven into a fabric. Therefore, the graphene composite fiber of the present invention can find application in various fields. Furthermore, the graphene composite fiber of the present invention can be mass-produced in a simple and economical manner and its length can be extended to tens of meters in a continuous process. Therefore, the graphene composite fiber of the present invention is ideally suited to industrial applications.

DESCRIPTION OF DRAWINGS

FIGS. 2A, 2B, 2C, and 2D show SEM images of the surface and cross-sectional morphologies of a graphene/PVA fiber according to the present invention: FIG. 2B is a surface image.

FIGS. 4A, 4B, 4C, and 4D graphically show the mechanical properties of graphene composite fibers.

MODE FOE INVENTION

The present invention will now be described in more detail with reference to exemplary embodiments thereof.

Figure 1A:
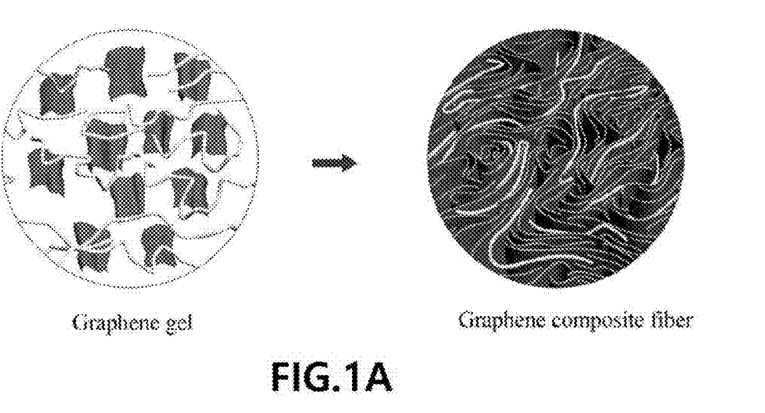
FIG. 1A is a conceptual diagram showing the procedure for producing a graphene composite fiber composed of graphene flakes having directivity and wrinkles according to the present invention.

FIG. 1 is a conceptual diagram showing the procedure for producing a fiber composed of graphene flakes having directivity and wrinkles according to the present invention. According to the method of the present invention, graphene can be prevented from restacking in the individual steps of producing a fiber from a graphene solution in order to maintain a wrinkled structure.

First, chemically converted graphene flakes (RCCGFs) with functional groups such as COOH groups are dispersed in dimethylformamide (DMF). An electrostatic repulsive force induced by the functional groups allows stable maintenance of the dispersion state of the graphene for at least 3 months without serious aggregation of the graphene. In this case, the following relationship is satisfied:

$$F_R > F_G + F_{V.D.W.}$$

where $F_R$, $F_G$, and $F_{V.D.W.}$ represent the electrostatic repulsive force, the force of gravity, and the van der Waals force between the graphene flakes, respectively. The relations of forces in the graphene solution during the overall fiber production procedure are as follows.

1. The chemically converted graphene is well dispersed in DMF under the following condition:

Electrostatic repulsive force≥(van der Waals force)+(force of gravity)

2. For a wet spinning solution, when DMF is exchanged with distilled water by centrifugation:

Electrostatic repulsive force≥(van der Waals force)+(force of gravity by graphene)+(centrifugal force)

3. The step of sufficiently dispersing graphene in distilled water with the help of SDBS as a surfactant:

Electrostatic repulsive forces(graphene+SDBS)+dispersion force by sonication≥(van der Waals force)+(force of gravity by graphene)

This condition may be varied with increasing time when a large amount of graphene is loaded, and as a result, the graphene may aggregate.

4. During wet spinning, PVA chains replace SDBS and the wrinkled graphene surrounded by the PVA chains is aligned in a graphene fiber by a shear force induced by a shear flow.

5. After wet spinning, a graphene gel in the solution undergoes a hydrostatic force. The hydrostatic force does not greatly affect restacking of the graphene.

6. Drying

Gravimetric force is applied during drying, but stacking occurs only in the axial direction, thus maintaining the wrinkled structure of the graphene.

Since hydrophobic interaction between graphene flakes is necessary for fiber production during wet spinning, the degree of reduction of the chemically converted graphene flakes is of importance. In other words, hydrophilicity of graphene flakes or somewhat less reduced graphene flakes impedes sufficient hydrophobic interaction between the graphene flakes, making the formation of a gel-fiber difficult.

Accordingly, appropriate reduction of graphene is essential for the preparation of a stable dispersion and the production of an assembly by wet spinning. The atomic fractions of carbon and oxygen in the reduced graphene flakes (RCCGF) determined from XPS data are 88.05% and 9.75%, respectively.

The graphene composite fiber of the present invention is produced by the following procedure. First, a graphene/DMF solution is prepared. The DMF is exchanged with distilled water by sonication and centrifugation, and the graphene is well dispersed in distilled water with the help of a surfactant to prepare a graphene solution. The graphene solution is incorporated into a coagulation bath containing polyvinyl alcohol (PVA). The graphene solution incorporated into the polymer is changed to a graphene gel-fiber by an assembly process through hydrophobic interaction between the graphene flakes surrounded by the PVA chains replacing the surfactant bonded to the graphene flakes. The graphene gel-fiber is washed with distilled water to remove excess PVA.

Although hydrostatic forces are applied to the graphene gel-fiber in the PVA solution and distilled water, the wrinkled structure of the graphene flakes can be maintained because the magnitudes of the hydrostatic forces in the x, y, and z directions are equal. Then, the graphene gel-fiber is suspended vertically and dried in air. As a result, the graphene-based fiber having a wrinkled structure is formed.

The present invention will be explained in detail with reference to the following examples and accompanying drawings. However, these examples are provided to assist in further understanding of the invention and are not to be construed as limiting the scope of the invention.

Example 1: Preparation of Solution of Graphene (RCCG) Chemically Converted by Reduction In accordance with the method illustrated in FIG. 1, RCCG was dispersed in dimethylformamide (DMF) in the presence of an appropriate amount of triethylamine to obtain a stable graphene dispersion. Several grams of RCCG was obtained by reducing an aqueous dispersion of CCG with excess hydrazine at 95° C. over 2 h in accordance with previously reported methods (Li, D., Muller, M. B., Gilje, S., Kaner, R. B. & Wallace, G. G. Processable aqueous dispersions of graphene nanosheets. *Nature Nanotech.* 3, 101 (2008)). As a result of the reduction reaction, the graphene aggregated in the aqueous solution. The graphene aggregates were acidified with dilute sulfuric acid under vigorous stirring to a pH of 2 or less, and transferred to a sintered funnel. The aggregates were washed with a large amount of Milli-Q water on the funnel until the pH reached about 7. The filtered material was dried under vacuum at 70° C. for 48 h to obtain RCCG as a solid. The dried RCCG powder was dissolved in DMF to prepare a 0.47-0.5 mg/mL RCCG/DMF solution. The length of the graphene flakes was about 400 nm, as measured using a Zetasizer. The particle size and zeta potential remained stable for several months. The dispersion was filtered under vacuum to obtain a paper having a resistance of 30-40 Ω/sq.

Example 2: Production of Graphene Flakes/PVA Composite Fiber

The solvent (DMF) of the graphene flake dispersion was exchanged with distilled water by centrifugation. The G/F aqueous solution was mixed with sodium dodecyl benzene sulfonate (SDBS) by ultrasonication.

The graphene dispersion was slowly injected into a coagulation bath containing PVA (molecular weight=89,000-124,000, degree of hydrolysis=~99%) through a syringe (26 gauge) and wet spun to continuously produce a uniform graphene/PVA fiber.

After dipping in a coagulation bath for one day, the graphene/PVA fiber was thoroughly washed with distilled water and vertically dried in air at room temperature. The graphene/PVA fiber was annealed at 150° C. and dipped in methanol for 8 h to obtain thermally drawn, methanol-treated GF/PVA. The annealing and methanol treatment increased the crystallinity of the PVA.

Experimental Example: Characterization of the Graphene Composite Fiber

Figure 1B:
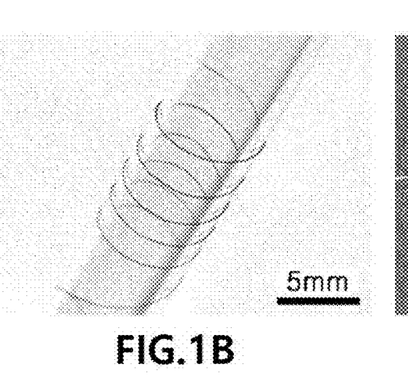
FIGS. 1B and 1C are images of the graphene composite fiber.
Figure 1C:
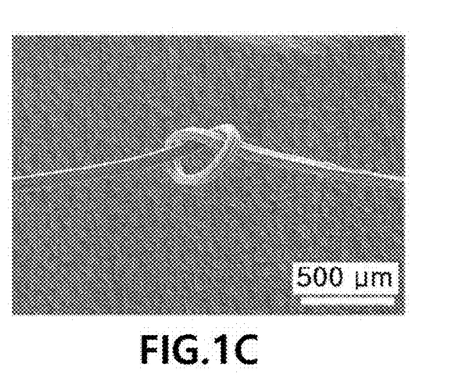
Figure 2A:
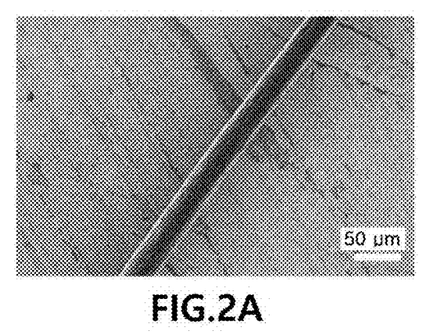
FIG. 2A is a low magnification image.
Figure 2B:
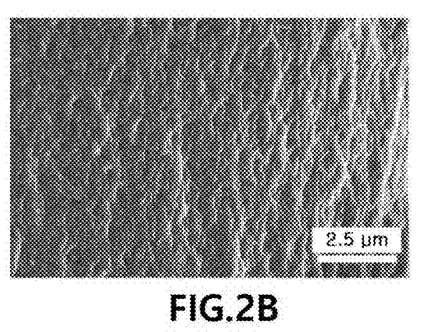
Figure 2C:
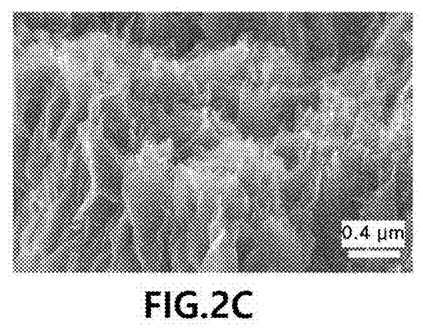
FIG. 2C is a side image of the graphene fiber aligned along the fiber axis.
Figure 2D:
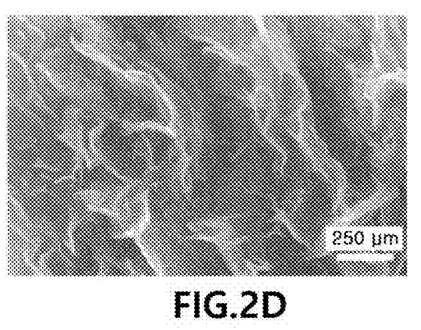
FIG. 2D is a side image of graphene flakes having a wrinkled structure in the graphene/PVA composite fiber.

The graphene composite fiber was sufficiently flexible and thus could be wound on a glass tube having a small diameter of 6.5 mm without mechanical damage, unlike graphene papers tending to be brittle (FIG. 1B). Complete knots of the graphene composite fiber were difficult to form, but the formation of sufficiently strong, flexible, small diameter knots of the graphene fiber was possible (FIG. 1C). Difficulty in the formation of complete knots was due to the small length of the graphene flakes and the frictional force of the rough surface of the graphene composite fiber composed of the graphene flakes (FIGS. 2B, 2F).

FIG. 2 shows SEM images of the surface and cross-sectional morphologies of the graphene/PVA fiber. The wrinkled graphene flakes were aligned along the axis of the fiber (FIG. 2C) and were formed into highly porous petals (FIG. 2D). These images demonstrate that the graphene flakes were formed into the fiber without serious restacking. The present inventors also discovered that even after the graphene/PVA was stretched by about 30% at 150° C., the wrinkled structure was maintained in the fiber.

Figure 3A:
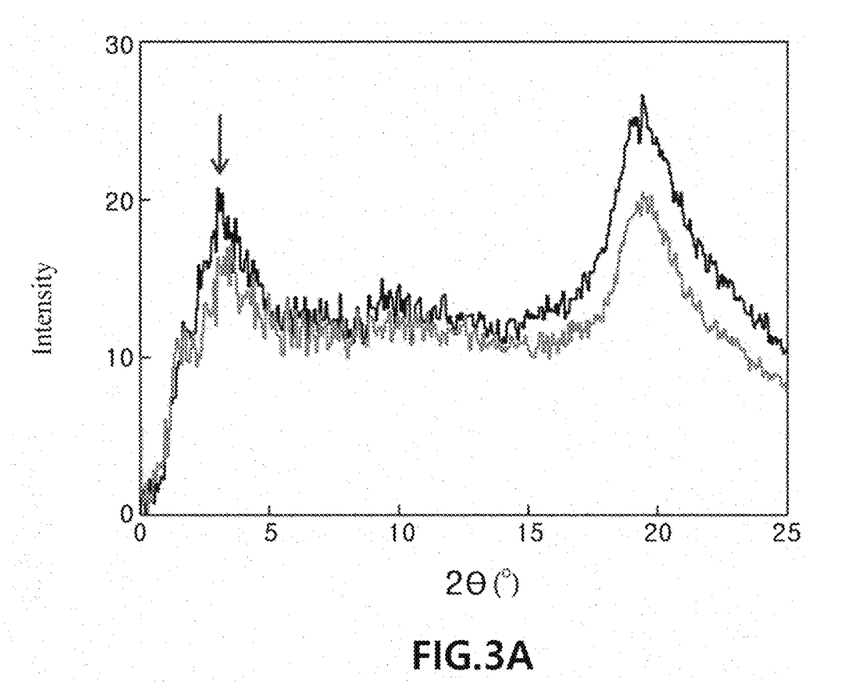
FIGS. 3A and 3B, respectively, show XRD and Raman spectra showing the layer-to-layer distances of graphene flakes and the number of graphene flake layers.
Figure 3B:
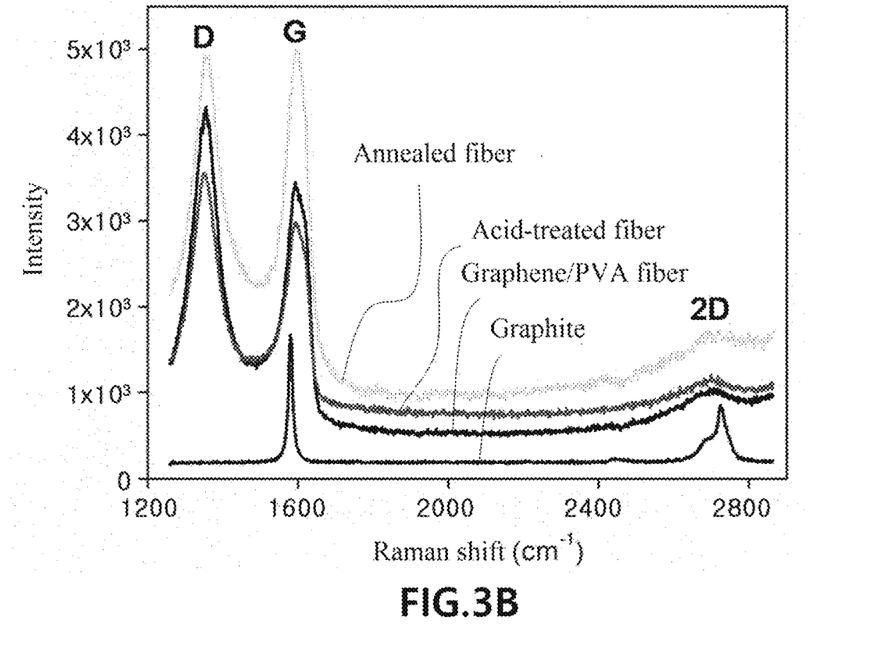

Good dispersibility of the graphene flakes in the PVA can be confirmed from XRD data. The layer-to-layer distances (d-spacings) before and after 20-30% thermal drawing were 28 and 27□, respectively. The large d-spacings indicate a good interaction between the hydrophilic PAV chains having a number of hydroxyl groups through hydrogen bonding at the hydrophilic edges of the chemically reduced graphene flakes. Further, the small difference in d-spacing indicates that the well-dispersed wrinkled structure was maintained despite the serious structural changes. The thermal drawing of 20-30% did not bring about a considerable increase in the alignment and crystallinity of the PVA chains.

In the present invention, the average size of the graphene flakes and the number of the graphene layers were analyzed. The size of the graphene flakes was calculated according to the equation described in the literature [U. Khan, A. O'Neill, M. Lotya, S. De, J. N. Coleman, *Small* 6, 864 (2010).].

$$I_D/I_G = x/16 + 0.2(x = 1/<w> + 1/<L>) \quad (2)$$

where $I_D$, $I_G$, $<w>$, and $<L>$ are the intensities of the D and G bands of the Raman spectrum, the area of the graphene flakes, and the length of the graphene flakes, respectively.

The size of the graphene flakes calculated according to Equation (2) was about 180 nm. This value is smaller than the size (300-400 nm) of graphene flakes deposited on a silicon (Si) substrate. This size was obtained from AFM and SEM data (see FIGS. 3 and 6). The smaller size of the graphene flakes in the fiber demonstrates the wrinkled structure of the graphene flakes. Meanwhile, the broad 2D band appeared at around 2700 $cm^{-1}$ in the Raman spectrum indicates that the wrinkled graphene flakes consisted of two to four graphene layers in the fiber. No peak shift was observed in the fiber. Therefore, it is thought that the number of the graphene layers was not changed even after annealing and acid treatment.

Figure 4A:
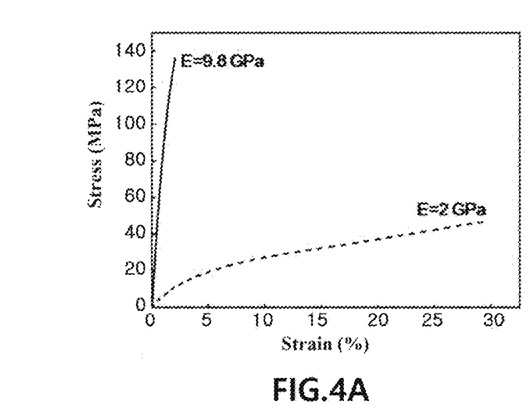
FIG. 4A shows stress-strain curves of a pure graphene/PVA fiber (the solid line represents values measured at room temperature and the dotted line represents values measured at 150° C.)

FIG. 4A shows stress-strain curves of the pure graphene/PVA fiber. In FIG. 4A, the solid line represents values measured at room temperature and the dotted line represents values measured at 150° C. The average mechanical strength and modulus of elasticity of the pure graphene/PVA fiber measured at room temperature were 125 MPa and 8.8 GPa, respectively. The mechanical strength values of the graphene composite fiber were similar to those of previously reported graphene papers and were much higher than those (5-10 MPa) of flexible graphite. The graphene composite fiber had much higher toughness than the graphene papers (FIG. 4D, Table 1). The mechanical properties of the graphene/PVA fiber were similar to those of single-walled carbon nanotubes/PVA fibers produced by wet spinning (mechanical strength: ~150 MPa, modulus of elasticity: 9-15 GPa).

Figure 7A:
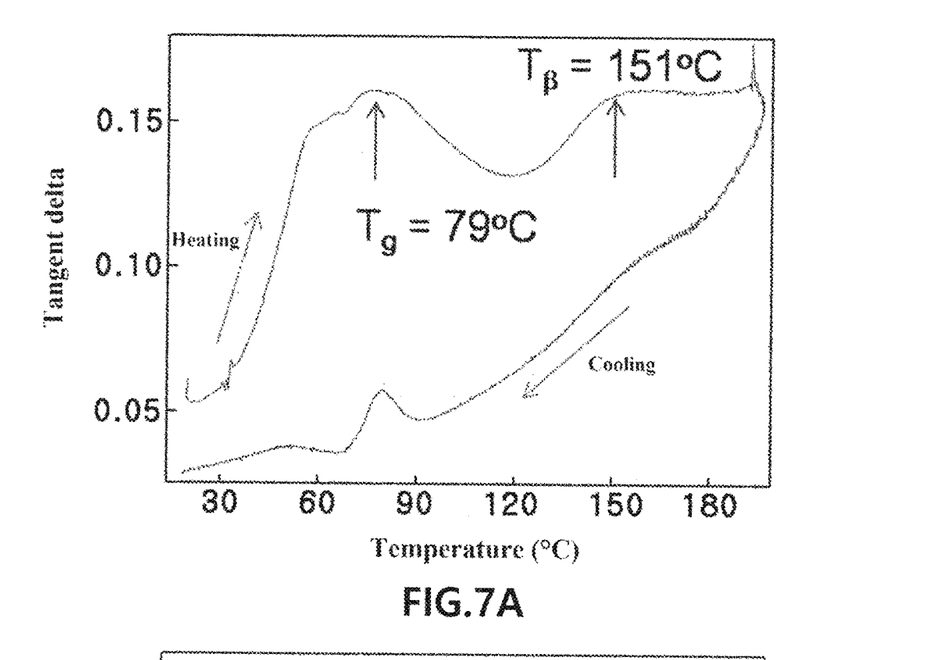
FIGS. 7A and 7B, respectively, show a plot of tangent delta vs. temperature and a plot of storage modulus vs. temperature for a pure graphene/PVA fiber.
Figure 7B:
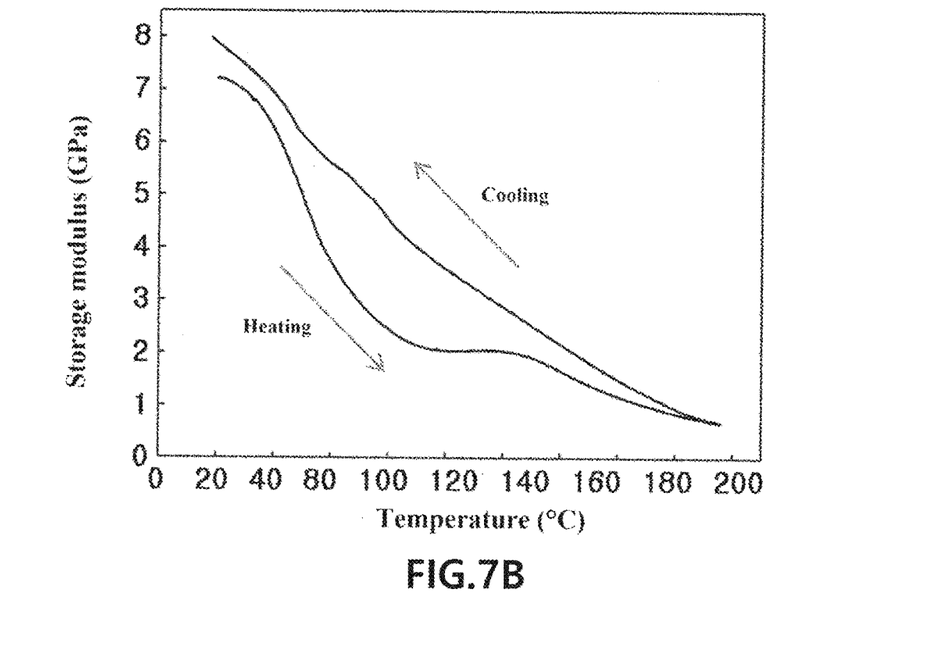
Figure 8:
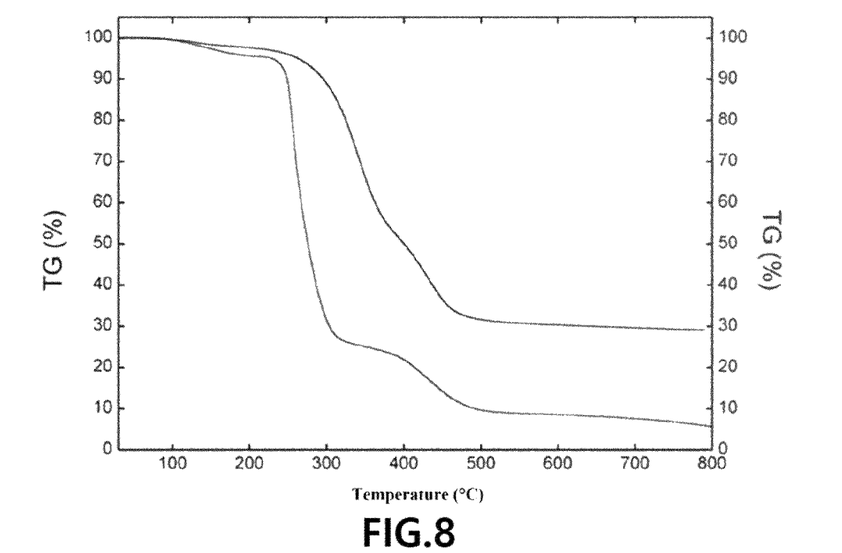
FIG. 8 shows TG-DTA spectra of a pure graphene/PVA fiber (black line) and a PVA powder (blue line).

The glass transition temperature ($T_g$) and crystal relaxation temperature ($T_\beta$) of the pure graphene/PVA fiber determined from changes in tangent delta and the storage modulus with increasing temperature were ~80° C. and ~150° C., respectively (FIG. 7). The graphene/PVA fiber was stretched by 25-35% above the glass transition temperature (near $T_\beta$). The increased stretching of the graphene/PVA fiber above the glass transition temperature is because of high porosity of the fiber resulting from the wrinkled structure of the graphene flakes despite the high content (~70 wt %) of the PVA (FIG. 8).

Figure 4B:
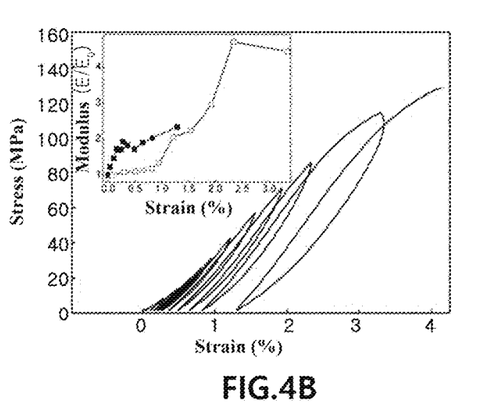
FIG. 4B shows cyclic stress-strain curves of a graphene/PVA fiber, the inset shows variations in the modulus of elasticity of the graphene/PVA fiber with increasing strain, as calculated from the cyclic stress-strain curves according to loading (filled squares) or unloading (open squares)
Figure 4C:
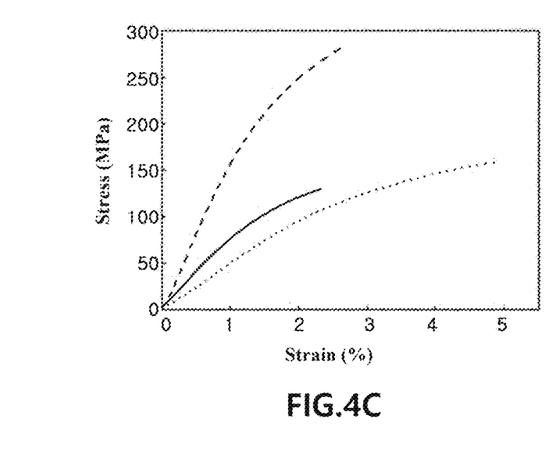
FIG. 4C shows stress-strain curves of a GF/PVA fiber measured under different conditions: when the fiber was annealed at 150° C. (solid line), and when annealed at 150° C. after dipping in methanol for 8 hours.
Figure 4D:
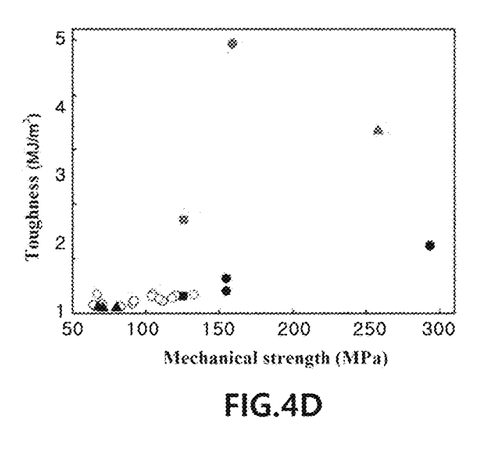
FIG. 4D graphically shows the toughness and mechanical strength values of a pure fiber (red filled square), a GF/PVA fiber annealed at 150° C. (red triangle), and a GF/PVA fiber treated with methanol (red filled circle) when compared to those of graphene oxide papers (open circles), reduced graphene papers (filled circles), an ion-modified graphene paper (filled square), and graphene/PVA films (filled triangles) including 44, 60, and 72% by weight of graphene reported in the literature.
Figure 5A:
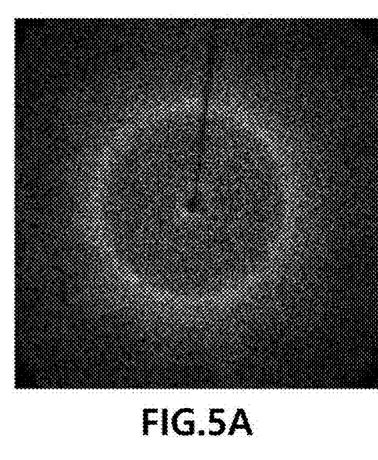
FIGS. 5A and 5B show 2-dimensional X-ray images of a graphene/PVA (A) before and (B) after the fiber was thermally drawn by 30%. The broad rings indicate that the PVA chains showed no change associated with better alignment thereof.
Figure 5B:
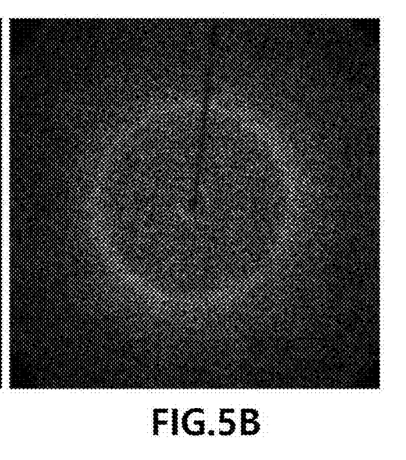
Figure 6A:
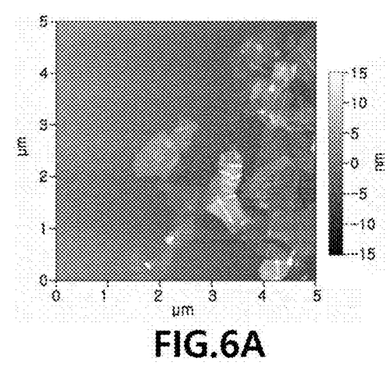
FIGS. 6A and 6B, respectively, show an AFM image and a SEM image of graphene flakes deposited on a silicon substrate from an aqueous dispersion.
Figure 6B:
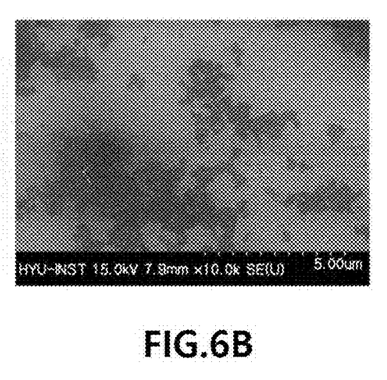

FIG. 4B shows that the modulus of elasticity of the pure graphene/PVA fiber varies depending on the strains calculated from the cyclic stress-strain curves. The modulus of the graphene fiber increased by factors of 2.2 and 4.7 according to the loading and unloading cycles, respectively. The significantly increased modulus according to the unloading cycle is thought to be due to the wrinkled structure of graphene, which makes the recovery of the sliding motion of the graphene difficult.

Figure 9A:
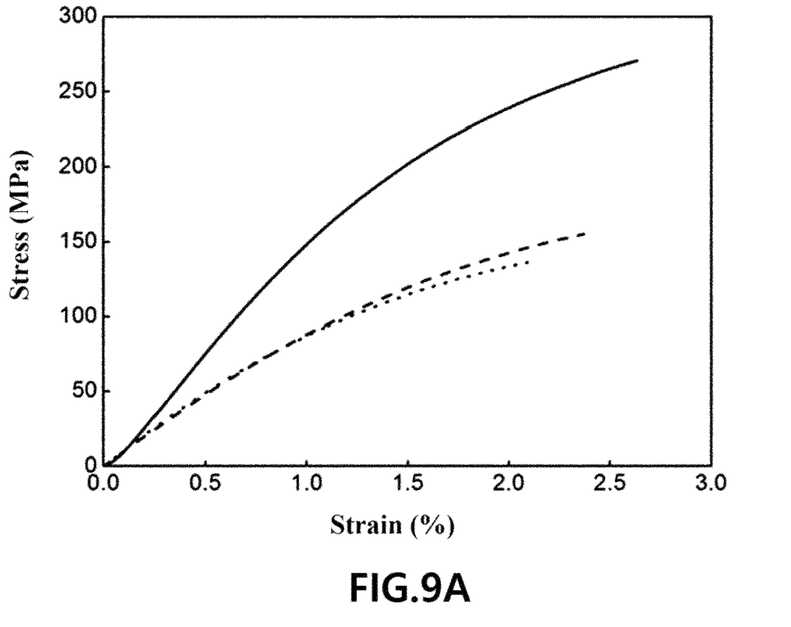
FIG. 9A shows stress-strain curves of a pure graphene/PVA fiber (dotted line), a graphene/PVA fiber annealed at 150° C., and a graphene/PVA fiber (dashed line) annealed at 150° C. and 213° C.
Figure 9B:
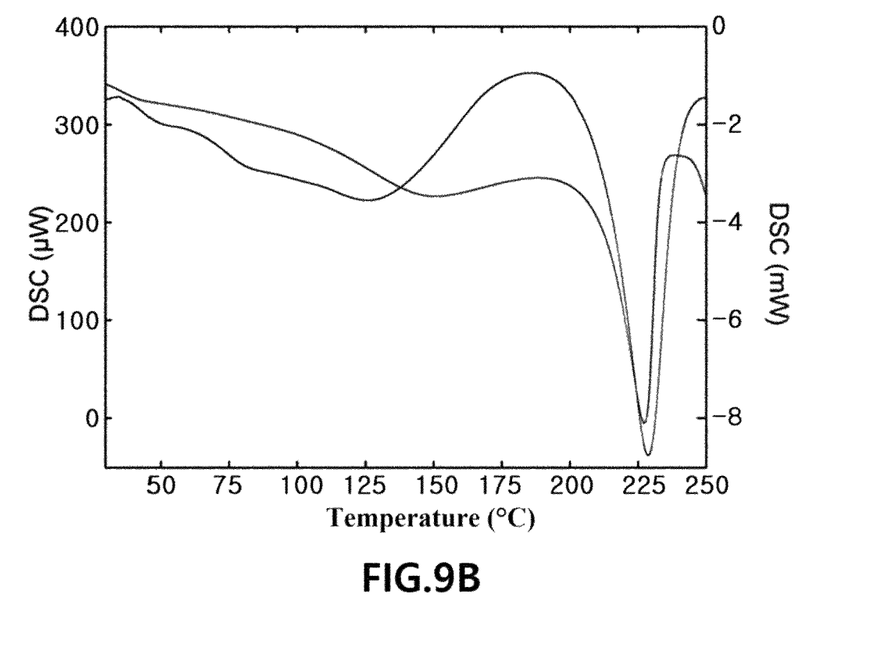
FIG. 9B shows DSC curves of a graphene/PVA fiber (black line) and a PVA powder (blue line).

From the cyclic stress-strain curves of the graphene/PVA fiber, the present inventors could conceive that the drawing assists in increasing the mechanical properties of the fiber. In order to increase the mechanical properties of the graphene/PVA fiber, the fiber was annealed at 150° C. for 1 h. The mechanical strength, modulus of elasticity, and toughness of the thermally drawn graphene/PVA fiber increased by 105%, 120%, and 95%, respectively, compared to those of the pure graphene/PVA fiber. The graphene/PVA fiber drawn under the above conditions after dipping in methanol for 8 h showed a maximum toughness of 4932 kJ/m³. This value is higher than any other kind of graphene material known to date. Graphene papers produced from graphene flakes reduced by vacuum filtration had maximum mechanical properties when annealed at 220° C. for 1 h. However, the mechanical properties of the graphene/PVA fiber annealed at 213° C. decreased because the PVA was thermally modified (FIG. 9).

The mechanical properties of the inventive graphene/PVA fiber were not better than the other graphene materials. However, the graphene/PVA composite fiber of the present invention showed superior toughness. Particularly, the thermally drawn graphene/PVA fiber showed much higher strength and toughness than graphene oxide papers and graphene oxide films (FIG. 4D).

Specifically, the mechanical strength, the modulus of elasticity, and toughness of the graphene/PVA composite fiber before annealing were 100-150 MPa, 5-10 GPa, and 1-2 MJ/m³, respectively. In contrast, the mechanical strength, the modulus of elasticity, and toughness of the graphene/PVA composite fiber after annealing at 150° C. were 250-300 MPa, 15-30 GPa, and 4.5-5.5 MJ/m³, respectively. The mechanical strength, the modulus of elasticity, and toughness of the graphene/PVA composite fiber treated with methanol or acetone (the graphene composite dried after dipping in methanol for 12 h) were 100-200 MPa, 5-10 GPa, and 3-4 MJ/m³, respectively. The mechanical properties of the graphene composite fiber according to the present invention were measured using a dynamic mechanical analyzer. As a result, the graphene composite fiber of the present invention was found to have a storage modulus of 1-10 GPa in the temperature range of 20-200° C., a tensile strength of 40-60 MPa at 150° C., and a modulus of elasticity of 1-3 GPa, which demonstrate its superior thermal stability. As a result of the TG-DTA test on the graphene composite fiber, no weight loss was observed in the range of 0-300° C. From these results, it is expected that the composite fiber of the present invention can be applied at high temperature.

INDUSTRIAL APPLICABILITY

As is apparent from the foregoing, the graphene composite fiber of the present invention has outstanding mechanical properties. In addition, the graphene composite fiber of the present invention can be formed into knot and spring structures due to flexibility thereof and can also be woven into a fabric. Therefore, the graphene composite fiber of the present invention is applicable to a wide variety of fields. The graphene composite fiber of the present invention can be mass-produced in a simple and economical manner and its length can be extended to tens of meters in a continuous process.

The invention claimed is:

1. A method for producing a graphene composite fiber, the method comprising:
    a) dispersing graphene and a surfactant in a solvent to prepare a dispersion,
    b) spinning the dispersion into a coagulation bath containing polymer solution to form a graphene-gel fiber, and
    c) drying the graphene-gel fiber to produce the graphene composite fiber.

2. The method according to claim 1, further comprising d) annealing the graphene composite fiber obtained in c) at a temperature of 140 to 160° C.

3. The method according to claim 1, further comprising d') dipping the graphene composite fiber obtained in c) in methanol or acetone to improve the degree of crystallization of the graphene composite fiber.

4. The method according to claim 1, wherein the graphene is chemically reduced graphene.

5. The method according to claim 1, wherein the graphene is chemically reduced graphene with acid functional groups.

6. The method according to claim 5, wherein the chemically reduced graphene is prepared by reducing an aqueous dispersion of graphene with hydrazine at 90 to 100° C. for 1 to 24 hours.

7. The method according to claim 1, wherein the surfactant is selected from sodium dodecyl benzene sulfonate (SDBS), sodium dodecyl sulfonate (SDS), Triton X-100, and cetyltrimethylammonium bromide (CTAB).

8. The method according to claim 1, wherein the solvent is water.

9. The method according to claim 1, wherein, in the coagulation bath, the polymer from the polymer solution is incorporated into the spun dispersion to form the graphene-gel fiber in which the graphene is surrounded by the polymer.

10. The method according to claim 1, wherein, during drying, the graphene gel-fiber is vertically suspended and dried.

11. The method according to claim 1, wherein the graphene is a graphene flake.

* * * * *